United States Patent [19]

Nagata

[11] Patent Number: 5,567,061
[45] Date of Patent: Oct. 22, 1996

[54] OUTPUT APPARATUS WITH DETACHABLE CHARACTER STORING CARTRIDGE

[75] Inventor: Satoshi Nagata, Tokyo, Japan

[73] Assignee: Canon Kabushiki Kaisha, Tokyo, Japan

[21] Appl. No.: 371,442

[22] Filed: Jan. 11, 1995

Related U.S. Application Data

[63] Continuation of Ser. No. 136,989, Oct. 18, 1993, abandoned, which is a continuation of Ser. No. 632,623, Dec. 26, 1990, abandoned, which is a continuation of Ser. No. 337,564, Apr. 13, 1989, abandoned.

[30] Foreign Application Priority Data

Apr. 18, 1988 [JP] Japan ................................. 63-095845

[51] Int. Cl.$^6$ ........................................................ B41J 5/00
[52] U.S. Cl. ............................. 400/61; 400/76; 400/692; 395/150
[58] Field of Search ............................... 400/61, 76, 692; 395/102, 109, 110, 139, 150, 151

[56] References Cited

U.S. PATENT DOCUMENTS

| | | | |
|---|---|---|---|
| 4,470,042 | 9/1984 | Barnich | 340/745 |
| 4,627,002 | 12/1986 | Blum et al. | 364/519 |
| 4,633,243 | 12/1986 | Bresenham | 340/739 |
| 4,686,525 | 8/1987 | Nagata | 340/790 |
| 4,763,281 | 8/1988 | Arakawa | 340/735 |
| 4,785,391 | 11/1988 | Apley | 340/730 |
| 4,837,712 | 6/1989 | Shibamiya | 400/70 |
| 4,872,091 | 10/1989 | Maniwa | 361/424 |

FOREIGN PATENT DOCUMENTS

| | | | |
|---|---|---|---|
| 0121126 | 10/1984 | European Pat. Off. | 400/121 |
| 3509206 | 9/1985 | Germany | 400/121 |
| 179261 | 9/1985 | Japan | 400/121 |
| 158473 | 7/1986 | Japan | 400/70 |
| 154973 | 7/1986 | Japan | 400/121 |
| 162365 | 7/1986 | Japan | 400/121 |
| 197252 | 9/1986 | Japan | 400/121 |
| 2182471 | 5/1987 | United Kingdom | 400/121 |

*Primary Examiner*—Edgar S. Burr
*Assistant Examiner*—Steven S. Kelley
*Attorney, Agent, or Firm*—Fitzpatrick, Cella, Harper & Scinto

[57] ABSTRACT

An output apparatus to which a plurality of detachable character pattern generators (font cartridges) can be attached comprises: a first character generator which is provided in the output apparatus main body and includes character pattern information constructed by a storing method other than an unprocessed dot matrix; a second character generator which is detachable from the output apparatus main body and includes character pattern information constructed by a storing method other than the unprocessed dot matrix; a socket to attach the second character generator to the apparatus main body; a discriminating circuit to decide whether the second character generator has keen attached to the socket or not; a controller for preferentially converting the characters included in the second character generator into the character patterns in the unprocessed dot matrix form that the characters included in the first character generator when the second character generator has been set to the socket and for storing the converted character patterns. When the font cartridge is set into the socket, the font of the font cartridge is developed into the font cache memory and if not, the font provided in the apparatus is developed into the font cache memory. Thus, the memory can be effectively used and the output throughput of the apparatus is improved.

104 Claims, 9 Drawing Sheets

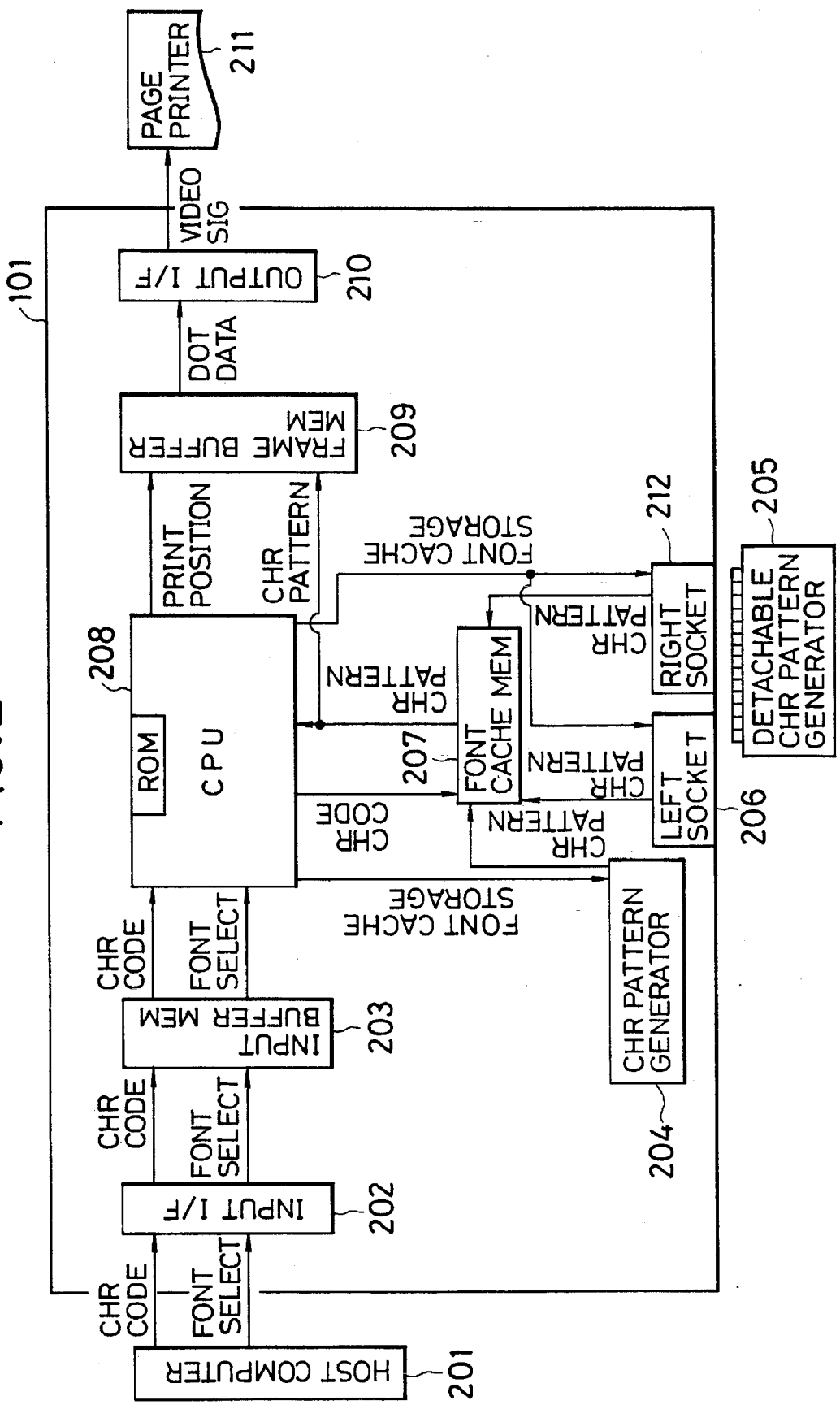

|       |   |   |   |   |   |   |   |   |
|------:|---|---|---|---|---|---|---|---|
|     0 | 0 | 0 | 0 | 0 | 0 | 0 | 0 | 0 |
|   + 4 | 0 | 0 | 0 | 0 | 0 | 0 | 0 | 0 |
|   + 8 | 0 | 3 | F | F | 8 | 0 | 0 | 0 |
|  + 12 | 0 | 3 | F | F | C | 0 | 0 | 0 |
|  + 16 | 0 | 3 | F | F | C | 0 | 0 | 0 |
|  + 20 | 0 | 0 | 1 | F | E | 0 | 0 | 0 |
|  + 24 | 0 | 0 | 1 | F | E | 0 | 0 | 0 |
|  + 28 | 0 | 0 | 1 | F | E | 0 | 0 | 0 |
|  + 32 | 0 | 0 | 3 | C | F | 0 | 0 | 0 |
|  + 36 | 0 | 0 | 3 | C | F | 0 | 0 | 0 |
|  + 40 | 0 | 0 | 7 | 8 | 7 | 8 | 0 | 0 |
|  + 44 | 0 | 0 | 7 | 8 | 7 | 8 | 0 | 0 |
|  + 48 | 0 | 0 | 7 | 8 | 7 | 8 | 0 | 0 |
|  + 52 | 0 | 0 | F | 0 | 3 | C | 0 | 0 |
|  + 56 | 0 | 0 | F | 0 | 3 | C | 0 | 0 |
|  + 60 | 0 | 1 | E | 0 | 1 | E | 0 | 0 |
|  + 64 | 0 | 1 | E | 0 | 1 | E | 0 | 0 |
|  + 68 | 0 | 1 | E | 0 | 1 | E | 0 | 0 |
|  + 72 | 0 | 3 | F | F | F | F | 0 | 0 |
|  + 76 | 0 | 3 | F | F | F | F | 0 | 0 |
|  + 80 | 0 | 7 | F | F | F | F | 8 | 0 |
|  + 84 | 0 | 7 | 8 | 0 | 0 | 7 | 8 | 0 |
|  + 88 | 0 | 7 | 8 | 0 | 0 | 7 | 8 | 0 |
|  + 92 | 0 | F | 0 | 0 | 0 | 3 | C | 0 |
|  + 96 | 0 | F | 0 | 0 | 0 | 3 | C | 0 |
| + 100 | 1 | E | 0 | 0 | 0 | 1 | E | 0 |
| + 104 | 1 | E | 0 | 0 | 0 | 1 | E | 0 |
| + 108 | 7 | F | C | 0 | 0 | F | F | 8 |
| + 112 | 7 | F | C | 0 | 0 | F | F | 8 |
| + 116 | 7 | F | C | 0 | 0 | F | F | 8 |
| + 120 | 0 | 0 | 0 | 0 | 0 | 0 | 0 | 0 |
| + 124 | 0 | 0 | 0 | 0 | 0 | 0 | 0 | 0 |

FIG.3(c)

| offset | | | | | | | | |
|---|---|---|---|---|---|---|---|---|
| 0   | E ① | F ② | 6 | B ③ | E | 6 | C ④ | E |
| +4  | F ⑤ | B | 8 ⑥ | E | F ⑦ | F ⑧ | A ⑨ | 4 |
| +8  | 2 | 4 | E | F ⑩ | 9 | 4 ⑪ | 4 | 4 |
| +12 | E ⑫ | F ⑬ | F | 8 | 4 ⑭ | 6 | 4 | E |
| +16 | F ⑮ | 7 | 4 | 8 ⑯ | 4 | E | F ⑰ | F ⑱ |
| +20 | 6 | D ⑲ | 5 | E | F ⑳ | 5 | D ㉑ | 7 |
| +24 | E | 5 | 4 | C ㉒ | 4 | E | F ㉓ | 4 ㉔ |
| +28 | 4 | D | 1 | 4 | E | F ㉕ | 3 ㉖ | 4 |
| +32 | D | 3 | 4 | E | F ㉗ | 1 | 9 ㉘ | A |
| +36 | 9 | E | F ㉙ | F ㉚ | E ㉛ | F ㉜ | | |

OUTPUT APPARATUS WITH DETACHABLE CHARACTER STORING CARTRIDGE

This application is a continuation of application Ser. No. 08/136,989 filed Oct. 18, 1993 now abandoned, which is a continuation of application Ser. No. 07/632,623 filed Dec. 26, 1990 now abandoned, which is a continuation of application Ser. No. 07/337,564 filed Apr. 13, 1989 now abandoned.

BACKGROUND OF THE INVENTION

1. Field of the Invention

The present invention relates to an output apparatus having a plurality of character pattern generating means and, more particularly, to an output apparatus to which detachable character pattern generating means can be attached.

2. Related Background Art

Hitherto, in many output apparatuses for outputting characters of apparatuses other than a type printer as dot patterns, character code data which is given from a host computer or the like is output from a character generator by previously developing the character patterns into a frame buffer memory (image memory of one page).

The types of character pattern information which are stored into the character generator can be mainly classified into the following three fonts.

(1) A font in which a character pattern is constructed by a simple (unprocessed) dot matrix itself (hereinafter, such a font is generally referred to as a "dot matrix font")

(2) A font in which the outline and stroke of a character are stored as coordinate points for the origin of the character (hereinafter, such a font is generally referred to as a "vector font (outline font)")

(3) A font in which a dot matrix pattern is constructed in a form which was processed by using some compressing technique (for instance, run length encoding) (hereinafter, such a font is generally referred to as a "compression font")

Among those fonts, the "dot matrix font" is most frequently used in the conventional output apparatus. This is because since a character pattern itself is stored in a dot matrix, it can be easily developed into the frame buffer memory at a high speed.

However, in association with advanced functions and high resolution of the output apparatus, character processing such as rotation and deformation of characters is required. Therefore, the use of what is called a "vector font" has also generally been started. On the other hand, as a measure to the realization of a large capacity of the fonts due to the high resolution, the use of the "compression font" has been started. Further, in recent years, the hybrid type in which those three fonts are mixedly used has also been proposed. Assuming that all of those fonts are referred to as a "non-dot matrix type" for the conventional "dot matrix type", the "non-dot matrix type" fonts have an advantage which is not provided by the "dot matrix type" font. However, as compared with the general simple "dot matrix type" font, the "non-dot matrix type" fonts have a drawback such that it takes a long time to develop a character pattern into the frame buffer memory.

To solve such a drawback, many of the output apparatuses which handle the "non-dot matrix type" fonts have a memory called what is called a "font cache".

The "font cache" memory is constructed in a manner such that when the "non-dot matrix type" font is developed into the frame buffer memory, it is previously converted into the "dot matrix type" font and the pattern is stored. Such a memory is used in many output apparatuses as a method which can contribute to improve the whole processing speed.

However, the font to be previously developed into the "font cache" memory is the fixed font and there no means for changing it. Therefore, there is an inconvenience such that even if the detachable character generator (what is called a font cartridge) is attached, the ordinary font provided in the output apparatus is fixedly stored into the "font cache" memory.

The applicant of the present invention has also filed the techniques with respect to the technique (outline font) in which character data is provided as an array of coordinate points on an outline in U.S. patent application Ser. No. 854,193 filed Apr. 21, 1986, U.S. patent application Ser. No. 914,150 filed Oct. 1, 1986, U.S. patent application Ser. No. 914,733 filed Oct. 2, 1986, U.S. patent application Ser. No. 148,712 filed Jan. 26, 1988, U.S. patent application Ser. No. 151,298 filed Feb. 1, 1988, and U.S. patent application Ser. No. 156,590 filed Feb. 17, 1988. Although the above techniques are technically quite different from the present invention, they are concerned with each other with respect to the large concept such that the outline font can be handled. According to them, there are provided: the technique to independently make an outline thick or thin in the vertical and lateral directions; the technique to uniformly make an outline thick or thin; the technique to deform (shadow, hatching, or the like) an outline font; the technique to prevent the occurrence of the painting out in the process to make an outline thin; the technique to realize a corrugation of a pattern generated; the technique to correct a line width in association with the enlargement or reduction; and the like.

Although the following techniques are also technically quite different from the present invention, there have been proposed: the technique to variably magnify or paint out an outline font in U.S.P. Re No. 30,679; the technique to modify a pattern by the delay of every scanning line by a video character generator in U.S. Pat. No. 4,408,198 (Kudirka); and the like.

SUMMARY OF THE INVENTION

In consideration of the above points, it is an object of the present invention to provide a recording apparatus as an output apparatus which has a "non-dot matrix type" font and to which a plurality of additional detachable character generators (font cartridges) each having characters in the "non-dot matrix type" font form can be attached, wherein there is provided means which is constructed in a manner such that when the font cartridge is attached to a special cartridge slot (for instance, if there are two slots, on the left side (the side which is generally frequently used)), the font of this font cartridge is developed into a font cache, on the other hand, if the same font cartridge is attached to the other slot (for instance, on the right side), the font of this font cartridge is not stored into the font cache but the font provided in the apparatus is stored into the cache, so that even in the same font cartridge, it can be used in accordance with the object in dependence on the high or low use frequency of the font cartridge.

The present invention is made in consideration of the drawbacks in the conventional apparatus as mentioned above and it is another object of the invention to provide an output apparatus which has therein a "non-dot matrix type" font and to which an additional detachable character generator (font cartridge) can be attached as a "non-dot matrix type" font, wherein there is provided means which is constructed in a manner such that when the font cartridge is attached, the font of this font cartridge is preferentially developed into a font cache and if no font cartridge is attached, the font provided in the apparatus is developed into the font cache, so that the font having a high use probability is developed into the font cache.

Such a construction is made by paying attention to the fact that there is generally a tendency such that in the case where a detachable character generator is attached to the output apparatus, the font of the detachable character generator in one page has a higher use frequency than that of the font of a character generator provided in the apparatus.

Still another object of the invention is to provide an output apparatus in which in the case where a "dot matrix type" font is provided in the apparatus or is externally attached as a cartridge to the apparatus, the dot font has a higher priority among the priorities of the fonts to be used, and in the case where a plurality of "non-dot matrix type" fonts are supplied, the priority for development is set to be higher for the cartridge font.

BRIEF DESCRIPTION OF THE DRAWINGS

FIGS. 2 and 6 are block diagrams showing examples of a construction of a printer control unit 101;

FIGS. 3(a) to 3(c) are explanatory diagrams of a character pattern storing method in an embodiment of the invention;

DETAILED DESCRIPTION OF THE PREFERRED EMBODIMENTS

A preferred embodiment of the present invention will be described in detail hereinbelow with reference to the drawings.

Figure 1:
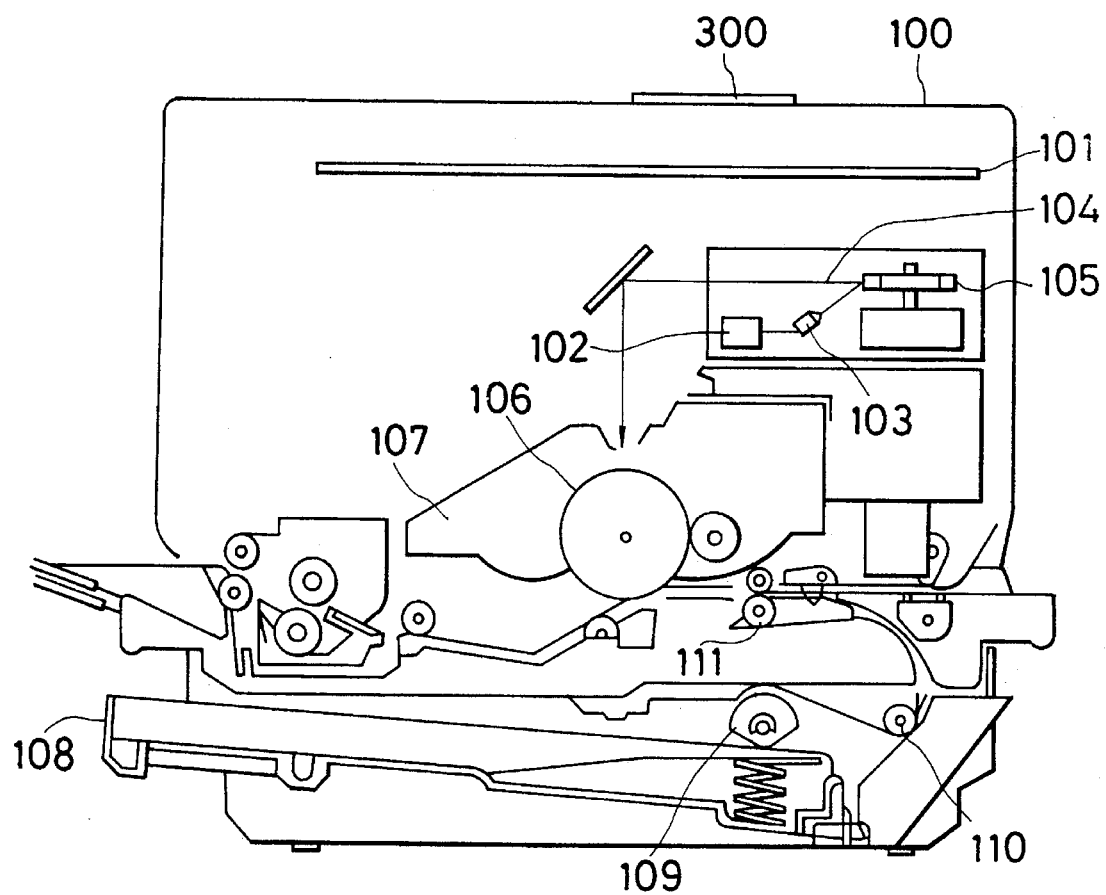
FIG. 1 is a cross sectional view showing an internal construction of a laser printer to which the present invention can be applied.

FIG. 1 is a cross sectional view showing an internal construction of a laser beam printer (hereinafter, also referred to as an LBP) in an embodiment according to the invention. The laser beam printer shown in FIG. 1 can register character patterns from a data source (not shown) and can register a regular format (form pattern). In the diagram, reference numeral 100 denotes an LBP main body for converting character information (character code), form information (form code), and the like which are supplied from a host computer (not shown) connected to the outside into corresponding character pattern, form pattern, and the like and forming an image onto a paper as a recording medium. Reference numeral 300 denotes an operation panel on which switches to operate, an LED display, and the like are arranged. Reference numeral 101 indicates a printer control unit to control the whole LBP 100 and to analyze character information or the like supplied from the host computer. The printer control unit 101 mainly converts the character information into the video signal of the corresponding character pattern and outputs to a laser driver 102. The laser driver 102 drives a semiconductor laser 103 and turns on or off a laser beam 104 emitted from the semiconductor laser 103 in accordance with the input video signal. The laser beam 104 is oscillated to the right and left by a rotating polyhedron mirror 105 and irradiated onto an electrostatic drum 106, so that the latent image of the character pattern is formed onto the drum 106. After the latent image is developed by a developing unit 107 arranged around the drum 106, it is transferred and copied onto a paper. Cut sheet papers are used as papers. The cut sheet papers are enclosed in a paper cassette 108 attached to the LBP 100 and are taken into the apparatus one by one by a paper feed roller 109 and conveying rollers 110 and 111 and fed to the drum 106.

FIG. 2 shows an example of a construction of a control system of the output apparatus of the invention.

The control system with the construction shown in the diagram relates to an example in the case of printing by a printing mechanism such as a laser beam printer for printing a document every page by receiving character code data and a control command sent from a print information generating source. Reference numeral 201 denotes a host computer to generate character code data and control commands; 202 indicates an input interface (I/F) comprising a receiving interface circuit to receive the character code data and control commands generated from the host computer 201; and 203 an input buffer memory comprising an RAM to temporarily store the character code data and control commands.

Reference numeral 204 denotes a character pattern generator in which patterns of a character font which is ordinarily used as a standard font is stored.

Reference numeral 205 denotes a detachable character pattern generator which can be attached/detached to/from the printer separately from the character pattern generator 204 which is provided in the printer as a standard generator. Each of the generators 204 and 205 comprises: an ROM to store a ("non-dot matrix type") character pattern which was compressed and encoded by using, for instance, a run length technique; and its control circuit. The generators 204 and 205 have what is called a code converting function to calculate an address of each of the character patterns from the character code data. Characters of the dot matrix patterns may be also stored in the internal character pattern generator 204. Reference numerals 206 and 212 denote left and right sockets to attach the detachable character pattern generator to the LBP main body.

Reference numeral 207 denotes a font cache memory to store the character patterns obtained by decoding the compression encoded character patterns into the unprocessed dot matrix patterns.

By storing the decoded character pattern into the font cache memory, there is no need to again decode the characters which were once used and the high speed printing can be realized.

Figure 5:
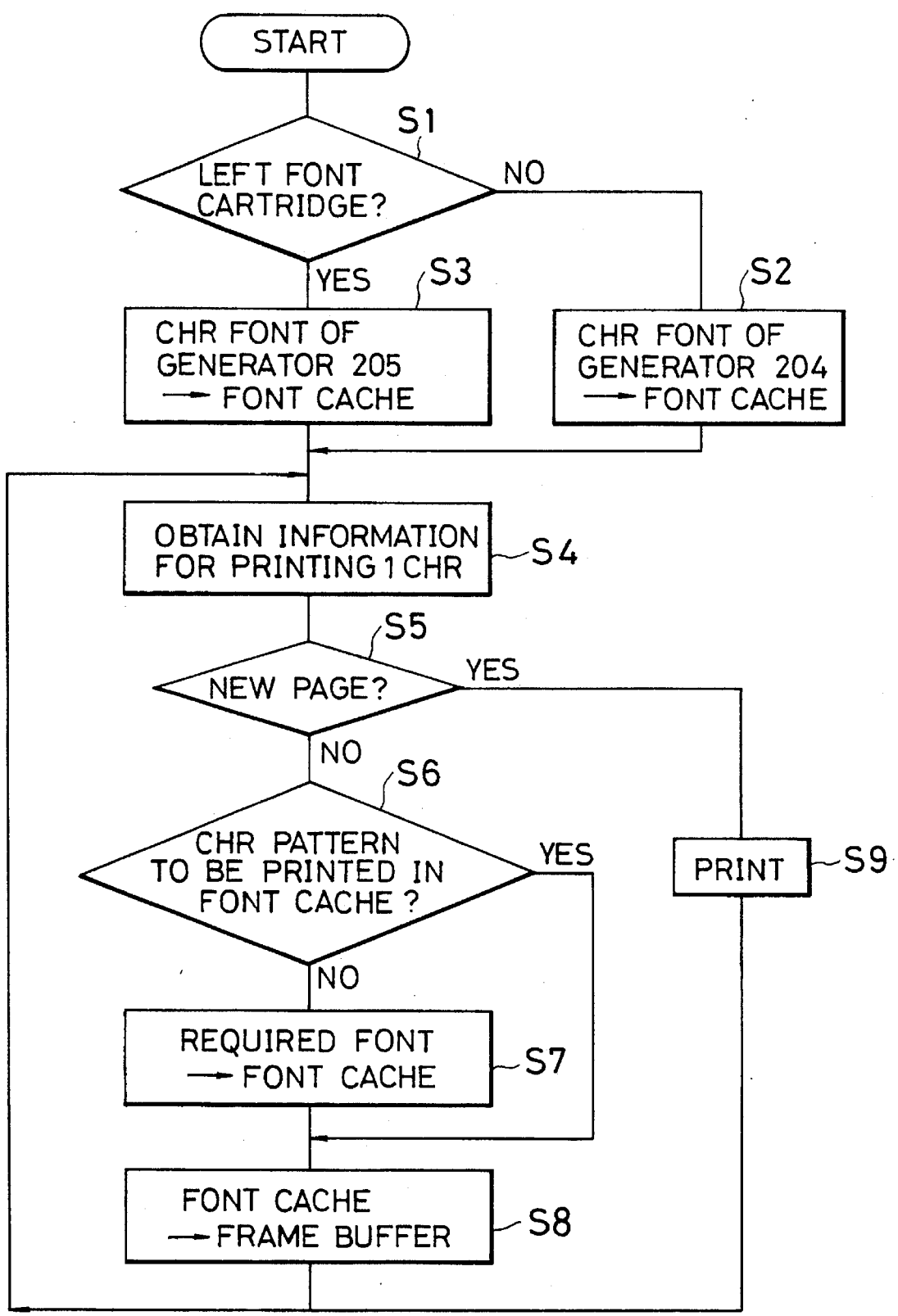
FIGS. 5 and 7 are flowcharts showing the control operation of a CPU in the apparatus of the embodiment.

Reference numeral 208 denotes a general microprocessor to control the whole control section. The microprocessor 208 has an ROM therein and controls the whole control system in accordance with a program stored in the ROM as shown in FIG. 5, which will be explained hereinafter.

Reference numeral 209 denotes a frame buffer memory of one page comprising a RAM to develop an image of the character pattern which had been generated from the character pattern generator and was once developed into the font cache memory to the proper position in accordance with a print position command from the host computer. Reference numeral 210 denotes an output interface (I/F) for generating a video signal according to dot pattern information from the frame buffer memory 209 and for performing the interface with a page printer 211; 211 indicates the page printer for receiving the video signal from the output I/F 210 and for printing the image information based on the video signal; and 101 the CPU board on which the control mechanism is installed (refer to FIG. 1).

Figure 3A:
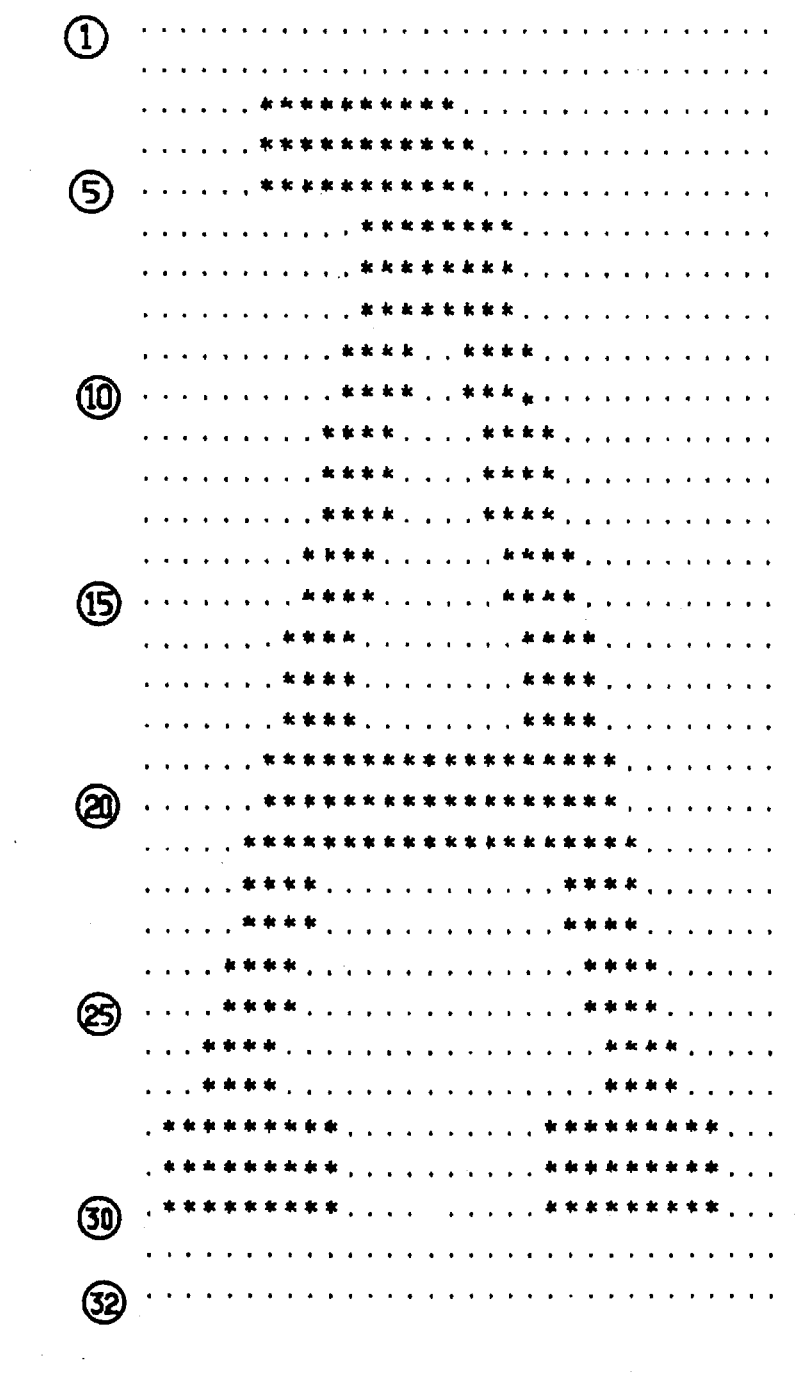

FIGS. 3(a) to 3(c) are diagrams for explaining an actual method of storing the "dot matrix font" and "non-dot matrix font" in the embodiment of the invention. FIG. 3(a) is a diagram showing visually the unprocessed "dot matrix font" in which the portions of "*" in the character pattern are image formed in black and the portions of "." are not image formed. The character pattern in this case has a width of 32 dots and a height of 32 dots.

As will be explained hereinlater, for the "non-dot matrix font" it is also possible to use a method whereby the outline of a character is expressed by coordinate values, direction difference code, and the like and is compression encoded (for instance, refer to Japanese patent application No. 60-222939).

FIG. 3(b) shows the content in the memory expressed by the hexadecimal notation in the case where the character pattern which is visually expressed as shown in FIG. 3(a) is stored into an ROM or RAM in the form of the unprocessed "dot matrix pattern". The bit corresponding to the portion which is image formed in black is set to "ON". The bit corresponding to the portion which is not image formed is set to "OFF". On the other hand, it will be understood that when the character of FIG. 3(a) is stored in the form of the "dot matrix pattern", the memory capacity of 128 bytes is needed. In the embodiment, the character pattern which is stored into the font cache memory 207 has such a form. FIG. 3(c) shows the content in the memory expressed by the hexadecimal notation in the case where the character pattern is stored in the form of the "non-dot matrix pattern" font. In the case of the embodiment, the font form is the "compression font" using the run length method as an example. Practically speaking, such a method is based on the following rules.

1. A unit of each code consists of four bits.

2. A delimiter code E (hexadecimal notation) (for instance, ① in FIG. 3(c)) is provided on each horizontal direction (scanning direction) unit basis.

3. Code E further has a meaning such that all of the bits after the delimiter in one scan are "O" (OFF).

4. The scan line having quite the same content as the preceding scan line is expressed by code "F" (for instance, ② in FIG. 3(c)).

5. A unit (four bits) of each code in the scan is expressed in accordance with the order of OFF (white) and ON (black) and repeated in accordance with this order (for instance, 6 in ③ in FIG. 3(c) is set to OFF and 13 is set to ON).

6. However, in the case where the length is 13 or longer, it is expressed by the sum of code D (hexadecimal notation) and one code unit (four bits) subsequent thereto (for instance, 8 in ⑲ in FIG. 3(c)). That is, only in this case, the length is expressed by eight bits.

For instance, the content "8464E"$_{hx}$ of the 14th scan denotes that an image is formed by "OFF is set to 8 bits, ON is set to 4 bits, OFF is set to 6 bits, ON is set to 4 bits, and the subsequent bits are set to OFF" from the left.

On the other hand, the content "44D14E"$_{hx}$ of the 24th scan similarly denotes that an image is formed by "OFF is set to 4 bits, ON is set to 4 bits, OFF is set to 14 bits (13+1), ON is set to 4 bits, and the subsequent bits are set to OFF" from the left.

It will be understood that by using the above rules, the character pattern expressed in FIG. 3(b) needs only the memory of 39 bytes. In the embodiment, the internal character pattern generator 204 and detachable character pattern generator 205 generate the "non-dot matrix fonts" using such a technique.

Figure 4:
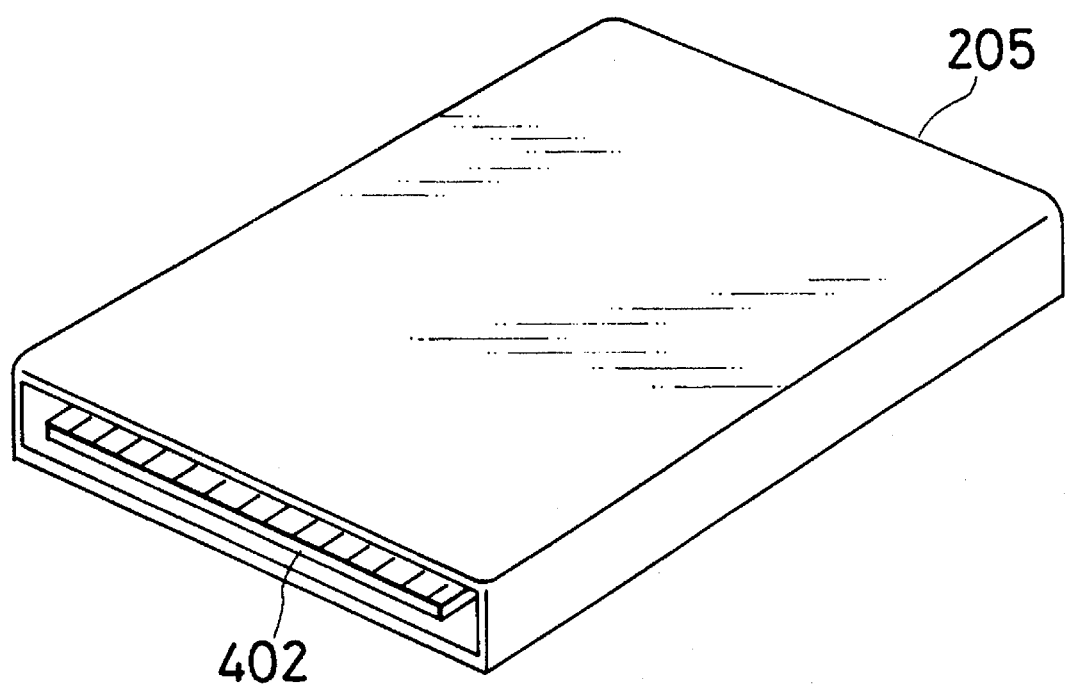
FIG. 4 is an external view of a detachable character generator in the apparatus of the embodiment.

FIG. 4 is an external view of the detachable character pattern generator 205. Reference numeral 402 denotes a connector to be inserted into the socket 206 or 212. The generator 205 is directly connected to a bus of the CPU (microprocessor) 208 through the connector 402 when it is attached.

FIG. 5 is a flowchart showing the whole control of the CPU 208.

In accordance with the flowchart of FIG. 5, an explanation will now be made with respect to the operations from the turn-on of power sources of the printer and CPU board 101 in the embodiment until the timing when the character code data stored in the input buffer memory 202 is converted into the character pattern data and the character pattern is transferred to the frame buffer memory 209 and printed by the page printer 211.

When the power source of the CPU board 101 is turned on, the CPU 208 executes a predetermined initialization (not shown) and, thereafter, immediately checks in step S1 to see if the detachable character pattern generator 205 has been attached to the left socket 206 (on the preferential side which is generally frequently used) or not. If YES, step S3 follows and the character font stored in the generator 205 attached to the left socket 206 is pattern developed into the font cache. That is, the "non-dot matrix font" as shown in the example of FIG. 3(c) is converted into the form shown in the example of FIG. 3(b) in accordance with the foregoing rules and stored into the font cache memory 207 comprising an RAM. If the detachable character pattern generator 205 is not attached to the left socket 206, step S2 follows and the character font stored in the internal character pattern generator 204 is similarly stored into the font cache memory 207. Although it takes a relatively long time for the above processes, they are executed within a time necessary to warm up the printer engine section at the turn-on of the power source, so that no obstacle occurs for the user. On the other hand, the font cache memory has a memory capacity enough to leave the capacity of about 20% of the whole capacity ever after all of the character patterns of each one of the internal character pattern generator 204 and the detachable character pattern generator 205 were stored.

In the next step S4, the print data sent from the host computer 201 is received from the input buffer memory 203 through the input I/F. In this step, the information to print one character, that is, the information with respect to the character code, designation of the print position, kind of font to be printed, and the like are received. Then, step S5 follows. In step S5, a check is made to see if the character code is a new page code (form feed code) or not. If NO, this means that the input character code indicates the code of the character to be printed, so that the processing routine advances to step S6. In step S6, a check is made to see if the character pattern to be printed has already been stored in the font cache memory 207 or not. If YES, step S8 follows and the position in the frame buffer memory where an image will be formed is controlled and the relevant character pattern is transferred from the font cache memory 207 to the frame buffer memory 209.

If it is decided in step S6 that the character pattern to be printed is not stored in the frame buffer memory, the necessary character pattern is developed into the font cache memory by using the cache memory space which has been left at the time of the font caching processes in the foregoing steps S3 and S2. If such a space area is also filled with the other character patterns, they are sequentially deleted on the basis of the FIFO system in accordance with the order from the oldest character pattern which has already been cached. In step S8 as well after completion of step S7, the same process as mentioned above is executed. After the character pattern of one character was developed into the frame buffer memory 209, the processing routine is returned to step S4 and the foregoing processes are repeated. During this processing loop, if the character code is determined to be the new page code in step S5, step S9 follows and the video signal is made through the output I/F 210 and the video signal of one page is sent to the page printer. The image of one page is printed by the foregoing electrophotographic process. Further, the data of the next page is extracted and the processing routine is returned to step S4 and the foregoing processes are repeated, thereby successively making pages.

Another embodiment

In the above embodiment, the laser beam printer has been used as an output apparatus. However, the invention can be also applied to, not only an LED printer, a liquid crystal printer, and an ink jet printer, but also to an image output apparatus such as a CRT instead of the above printers.

On the other hand, although the embodiment has used the font using the run length technique as the "non-dot matrix type" font, the invention can be also applied to the other wide "non-dot matrix fonts" such as outline font in which what are called outline coordinates are stored, font in which the strokes of characters are stored, font which is formed by synthesizing radicals of KANJI (Chinese character), and the like. Further, although the font cache has been provided in the RAM, it can be also easily substituted to another memory medium (hard disk or the like).

Moreover, in the above embodiment, both of the internal character generator and the detachable character generator use the "non-dot matrix type" fonts. However, they can also use different techniques.

In addition, although two slots have been provided for the detachable character pattern generator, the number of slots may be also set to three or more.

Figure 6:
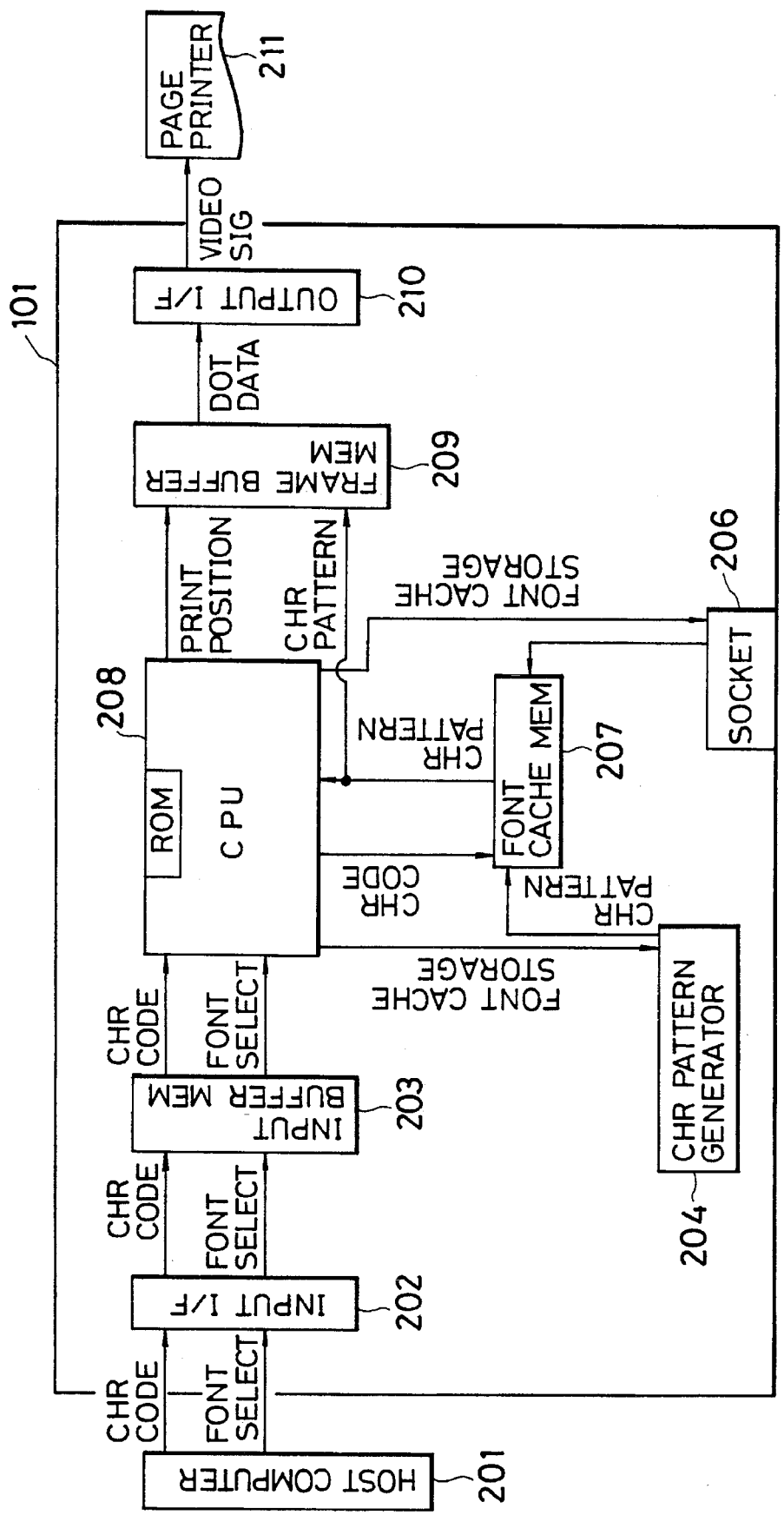
Figure 7:
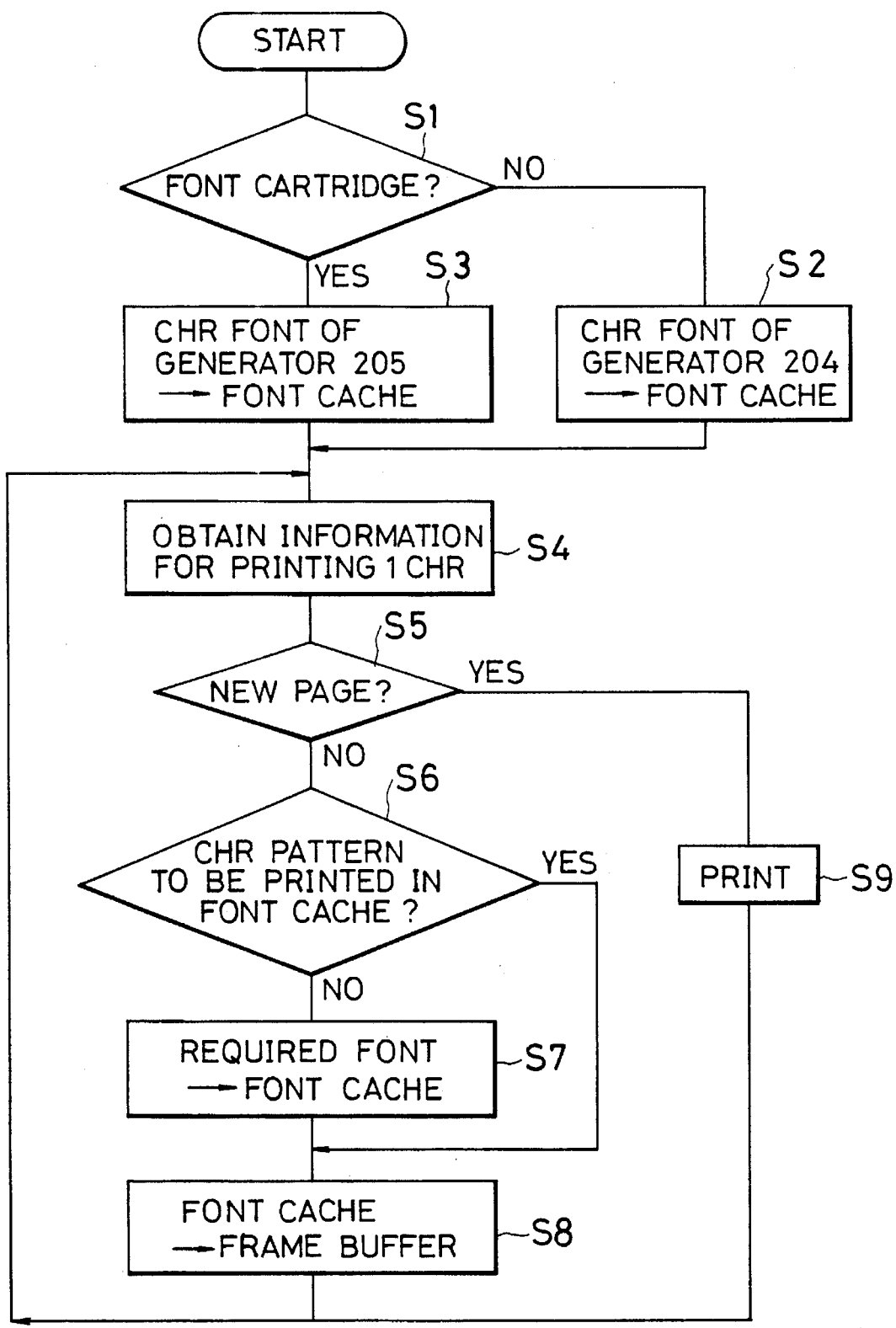

In a manner similar to FIG. 2, FIG. 6 shows an example in the case of using one socket. In FIG. 6, only the socket 206 is provided. The descriptions of the other portions are omitted here. FIG. 7 (similar to FIG. 5) shows a control flowchart in the case of FIG. 6.

In the embodiment of FIG. 6, in step S1, a check is made to see if the font cartridge (detachable character pattern generator) has been attached to the socket 206 in FIG. 6 or not. If YES, step S3 follows and the pattern of the font cartridge is developed into the font cache memory. The processes in the other steps are omitted since they are similar to those explained in FIG. 5.

Further, in the embodiment, although both of the internal character generator and the detachable character generator use the "non-dot matrix type" font, the invention can be also applied to the case where either one of those generators uses the "dot matrix type" font and the other uses the "non-dot matrix type" font.

In such a case, the priorities to select the fonts of, for instance, the same point size and the same type style are set in a manner such that the "dot matrix type" font has the highest priority and the "non-dot matrix type" font has the second priority. Even in such a case, it is effective to set the priority for cache development among a plurality of "non-dot matrix type" fonts in accordance with the spirit of the invention.

The selection priority denotes that the font stored in which position is used for a code indicative of a character pattern to be output. The development priority denotes that the "non-dot matrix type" font stored at which position is cached and developed into the bit map type.

As described above, according to the invention, attention is paid to the fact that the use frequency of the character font of the font cartridge is generally higher than that of the character font provided in the apparatus. If the font cartridge is attached, the font of the font cartridge is developed into the font cache memory. If no font cartridge is attached, the font provided in the apparatus is developed into the font cache memory. Thus, there are advantages such that the font cache memory is effectively used and the font cache hitting ratio is improved. Thus, the output throughput of the whole output apparatus is improved.

As described above, according to the invention, attention is paid to that there is a possibility such that the kind of font which will be frequently used varies every user. When a font cartridge having a high use frequency in one page is used, it is attached to a special font socket (the left socket in the embodiment). When a font cartridge having a low use frequency in one page is used, it is attached to the other font socket (the right socket in the embodiment). Due to this, the prescribed font of a high use frequency can be printed at a high speed. On the other hand, even in the case of simultaneously using two kinds of font cartridges, the font caching process is preferentially executed for the font cartridge having a higher use frequency in the page. Thus, there are advantages such that the font cache memory is effectively used and the font cache hitting ratio is improved. Consequently, the output throughput of the whole output apparatus is improved.

What is claimed is:

1. An output apparatus to which a detachable character storing means can be attached, comprising:

first character storing means which is provided in an output apparatus main body and which stores vector type character pattern information;

attaching means for detachably attaching second character storing means which stores vector type character pattern information;

converting means for converting vector type character pattern information stored in said first and or in said second character storing means into a dot type character pattern; and caching means for caching in a memory the dot type character pattern converted by said converting means, wherein said converting means converts the vector type character pattern information stored in the second character storing means rather than converting the vector type character pattern information stored in the first character storing means in the case where the second character storing means has been attached.

2. An apparatus according to claim 1, wherein the non-dot type character pattern information is a vector font.

3. An output apparatus according to claim 1, wherein said apparatus is a laser beam printer.

4. An output apparatus according to claim 1, wherein said apparatus is an LED printer.

5. An output apparatus according to claim 1, wherein said apparatus is an LCD printer.

6. An output apparatus according to claim 1, wherein said apparatus is an ink jet printer.

7. An output apparatus according to claim 1, wherein said apparatus is a CRT.

8. An output apparatus according to claim 1, further comprising means for receiving exterior code information and means for selectively outputting the converted character pattern stored in the memory.

9. An output apparatus according to claim 1, wherein said first character storing means also stores dot type character pattern information.

10. An output apparatus according to claim 9, further comprising memory means for storing dot pattern data to be outputted, the dot pattern data comprising at least one dot pattern.

11. An output apparatus according to claim 10, wherein the dot type character pattern information stored in said first character storing means is stored in said memory means with a higher priority.

12. An output apparatus according to claim 1, wherein said second character storing means also stores dot type character pattern information.

13. An output apparatus according to claim 12, further comprising memory means for storing dot pattern data to be outputted, the dot pattern data comprising at least one dot pattern.

14. An output apparatus according to claim 13, wherein the dot type character pattern information stored in said second character storing means is stored in said memory means with a higher priority.

15. An output apparatus according to claim 1, wherein the converted character pattern is stored in the cache in FIFO.

16. An output apparatus according to claim 1, further comprising:

buffer means for storing one page of dot pattern data to be outputted;

determining means for determining whether a dot pattern corresponding to character data to be outputted is stored in the memory; and control means operable in the event that said determining means determines that a dot pattern corresponding to the character data is not stored in the memory for controlling said converting means to convert the character data into a dot type character pattern and controlling said buffer means to store the newly converted character pattern.

17. An output apparatus according to claim 1, further comprising memory means for storing dot pattern data to be outputted, the dot pattern data comprising at least one dot pattern.

18. An output apparatus according to claim 17, wherein said memory means selects at least one dot pattern from the converted character patterns stored in the memory, and stores the selected at least one dot pattern.

19. An output apparatus according to claim 17, further comprising means for managing locations at which the dot pattern data are developed in said memory means.

20. An output apparatus to which detachable character storing means can be attached, comprising:

first character storing means which is provided in an output apparatus main body and which stores vector type character pattern information;

second character storing means which is attachable to and detachable from the output apparatus main body and which stores vector type character pattern information;

a plurality of attaching means for attaching said second character storing means to the output apparatus main body;

converting means for converting the vector type character pattern information in said first or second character storing means into a dot type character pattern;

caching means for caching the dot type character pattern converted by said converting means in a memory; and control means for controlling said converting means and said caching means so that in a case where said second character storing means has been attached to a selected one of said plurality of attaching means, the vector type character pattern information in said second character storing means is converted into a dot type character pattern and stored in the memory, and in a case where said second character storing means has not been attached to the selected one of said plurality of attaching means, the vector type character pattern information in said first character storing means is converted into a dot type character pattern and stored in the memory.

21. An apparatus according to claim 20, wherein in the Case where the second character storing means has been attached to any one of said plurality of attaching means other than said selected one of the attaching means, the characters stored in the first character storing means are converted into the dot type character patterns and the converted character patterns are stored in the cache.

22. An output apparatus according to claim 20, wherein said apparatus is laser beam printer.

23. An output apparatus according to claim 20, wherein said apparatus is an LED printer.

24. An output apparatus according to claim 20, wherein said apparatus is an LCD printer.

25. An output apparatus according to claim 20, wherein said apparatus is an ink jet printer.

26. An output apparatus according to claim 20, wherein said apparatus is a CRT.

27. An output apparatus according to claim 20, further comprising means for receiving exterior code information and means for selectively outputting the converted character pattern stored in the memory.

28. An output apparatus according to claim 20, wherein said first character storing means also stores dot type character pattern information.

29. An output apparatus according to claim 28, further comprising additional memory means for storing dot pattern data to be outputted, the dot pattern data comprising at least one dot pattern.

30. An output apparatus according to claim 29, wherein the dot type character pattern information stored in said first character storing means is stored in said additional memory means with a higher priority.

31. An output apparatus according to claim 20, wherein said second character storing means also stores dot type character pattern information.

32. An output apparatus according to claim 31, further comprising additional memory means for storing dot pattern data to be outputted, the dot pattern data comprising at least one dot pattern.

33. An output apparatus according to claim 32, wherein the dot type character pattern information stored in said second character storing means is stored in said additional memory means with a higher priority.

34. An output apparatus according to claim 20, wherein the converted character pattern is stored in said memory in FIFO.

35. An output apparatus according to claim 20, further comprising:
buffer means for storing one page of dot pattern data to be outputted;
determining means for determining whether a dot pattern corresponding to character data to be outputted is stored in the memory; and
control means operable in the event that said determining means determines that a dot pattern corresponding to the character data is not stored in the memory for controlling said converting means to convert the character data into a dot type character pattern and controlling said buffer means to store the newly converted character pattern.

36. An output apparatus according to claim 20, further comprising additional memory means for storing dot pattern data to be outputted, the dot pattern data comprising at least one dot pattern.

37. An output apparatus according to claim 36, wherein said additional memory means selects at least one dot pattern from the converted character patterns stored in the memory, and stores the selected at least one dot pattern.

38. An output apparatus according to claim 36, further comprising means for managing locations at which the dot pattern data are developed in said additional memory means.

39. An output apparatus to which a detachable character storing means can be attached, comprising:
first character storing means which is provided in an output apparatus main body and which stores non-dot type character pattern information;
attaching means for detachably attaching second character storing means which stores non-dot type character pattern information;
converting means for converting non-dot type character pattern information stored in said first and or in the second character storing means into a dot type character pattern; and
caching means for caching in a memory the dot type character pattern converted by said converting means,
wherein said converting means converts the non-dot type character pattern information stored in the second character storing means rather than converting the non-dot type character pattern information stored in said first character storing means in a case where the second character storing means has been attached, and
wherein the non-dot matrix type character pattern information stored in said first or second character storing means is of run-length type.

40. An output apparatus to which detachable character storing means can be attached, comprising:
first character storing means which is provided in an output apparatus main body and which stores non-dot type character pattern information;
second character storing means which is attachable to and detachable from the output apparatus main body and which stores non-dot type character pattern information;
a plurality of attaching means for attaching said second character storing means to the output apparatus main body;
converting means for converting the non-dot type character pattern information in said first or second character storing means into a dot type character pattern;
caching means for caching the dot type character pattern converted by said converting means in a memory; and
control means for controlling said converting means and said caching means so that in a case where said second character storing means has been attached to a selected one of said plurality of attaching means, the non-dot type character pattern information in said second character storing means is converted into a dot type character pattern and stored in the memory, and in a case where said second character storing means has not been attached to the selected one of said plurality of attaching means, the non-dot type character pattern information in said first character storing means is converted into a dot type character pattern and stored in the memory,
wherein the non-dot matrix type character pattern information stored in said first or second character storing means is of run-length type.

41. An output method comprising:
providing a first character storing means in an output apparatus main body, said first character storing means for storing non-dot type character pattern information;
converting characters in said first character storing means into dot type character patterns and storing the converted character pattern in a cache in a case where a second character storing means has not been attached to the main body, said second character storing means being attachable to and detachable from the output apparatus main body and for storing non-dot type character pattern information; and
converting characters in the second character storing means rather than converting characters in said first character storing means and storing the converted character pattern in the cache in a case where said second character storing means has been attached,
wherein the non-dot matrix type character pattern information stored in said first or second character storing means is of run-length type.

42. An output method comprising:
providing a first character storing means in an output apparatus main body, said first character storing means for storing vector type character pattern information;
converting characters in said first character storing means into dot type character patterns and storing the converted character pattern in a cache in a case where a second character storing means has not been attached to the main body, said second character storing means being attachable to and detachable from the output apparatus main body and for storing vector type character pattern information; and
converting characters in the second character storing means rather than converting characters in said first character storing means and storing the converted character pattern in the cache in a case where said second character storing means has been attached.

43. A method according to claim 42, wherein said apparatus is a laser beam printer.

44. A method according to claim 42, wherein said apparatus is an LED printer.

45. A method according to claim 42, wherein said apparatus is an LCD printer.

46. A method according to claim 42, wherein said apparatus is an ink jet printer.

47. A method according to claim 42, wherein said apparatus is a CRT.

48. A method according to claim 42, further comprising the steps of receiving exterior code information and selectively outputting the converted character pattern stored in the cache.

49. A method according to claim 42, wherein said first character storing means also stores dot type character pattern information.

50. A method according to claim 49, further comprising the step of storing dot pattern data to be outputted, the dot pattern data comprising at least one dot pattern.

51. A method according to claim 50, wherein the dot type character pattern information stored in said first character storing means is stored in said step of storing with a higher priority.

52. A method according to claim 42, wherein said second character storing means also stores dot type character pattern information.

53. A method according to claim 52, further comprising the step of storing dot pattern data to be outputted, the dot pattern data comprising at least one dot pattern.

54. A method according to claim 53, wherein the dot type character pattern information stored in said second character storing means is stored in said step of storing with a higher priority.

55. A method according to claim 42, wherein the converted character pattern is stored in the cache in FIFO.

56. A method according to claim 42, further comprising the steps of:
storing one page of dot pattern data to be outputted;
determining whether a dot pattern corresponding to character data to be outputted is stored in the cache; and
in the event that in said determining step it is determined that a dot pattern corresponding to the character data is not stored in the cache, controlling said converting steps so that the character data is converted into a dot type character pattern and the newly converted character pattern is stored.

57. A method according to claim 42, further comprising the step of storing dot pattern data to be outputted, the dot pattern data comprising at least one dot pattern.

58. A method according to claim 57, wherein in said step of storing, at least one dot pattern is selected from the converted character patterns stored in the cache, and the selected at least one dot pattern is stored.

59. A method according to claim 57, further comprising the step of managing locations at which the dot pattern data are developed.

60. A method according to claim 42, wherein characters converted in said second converting step are always characters in said second character storing means.

61. An output method comprising:
providing first character storing means in an output apparatus main body, the first character storing means for storing vector type character pattern information, the output apparatus having a plurality of attaching means for attaching second character storing means to the output apparatus main body, the second character storing means being attachable to and detachable from at least one of the plurality of attaching means and for storing vector type character pattern information;
converting a character pattern in the first or second character storing means into a dot type character pattern and storing the converted character pattern in a cache; and
controlling said converting step so that in a case where the second character storing means has been attached to a selected one of the plurality of attaching means, characters in the second character storing means are converted into dot type character patterns, and in a case where the second character storing means has not been attached to the selected one of the plurality of attaching means, characters in the first character storing means are converted into dot type character patterns.

62. A method according to claim 61, wherein in the case where the second character storing means has been attached to any one of the plurality of attaching means other than the selected one of the attaching means, the characters stored in the first character storing means are converted into the dot type character patterns and the converted character patterns are stored.

63. A method according to claim 61, wherein said apparatus is laser beam printer.

64. A method according to claim 61, wherein said apparatus is an LED printer.

65. A method according to claim 61, wherein said apparatus is an LCD printer.

66. A method according to claim 61, wherein said apparatus is an ink jet printer.

67. A method according to claim 61, wherein said apparatus is a CRT.

68. A method according to claim 61, further comprising the steps of receiving exterior code information and selectively outputting the converted character pattern stored in the cache.

69. A method according to claim 61, wherein said first character storing means also includes dot type character pattern information.

70. A method according to claim 69, further comprising the step of storing dot pattern data to be outputted, the dot pattern data comprising at least one dot pattern.

71. A method according to claim 70, wherein the dot type character pattern information stored in said first character storing means is stored in said step of storing with a higher priority.

72. A method according to claim 61, wherein said second character storing means also stores dot type character pattern information.

73. A method according to claim 72, further comprising the step of storing dot pattern data to be outputted, the dot pattern data comprising at least one dot pattern.

74. A method according to claim 73, wherein the dot type character pattern information stored in said second character storing means is stored in said step of storing with a higher priority.

75. A method according to claim 61, wherein the converted character pattern is stored in said memory in FIFO.

76. A method according to claim 61, further comprising the steps of:
storing one page of dot pattern data to be outputted;
determining whether a dot pattern corresponding to character data to be outputted is stored in the cache; and
in the event that in said determining step it is determined that a dot pattern corresponding to the character data is not stored in the cache, controlling said converting step so that the character data is converted into a dot type character pattern and the newly converted character pattern is stored.

77. A method according to claim 61, further comprising the step of storing dot pattern data to be outputted, the dot pattern data comprising at least one dot pattern.

78. A method according to claim 77, wherein in said step of storing, at least one dot pattern is selected from the converted character patterns stored in the cache, and the selected at least one dot pattern is stored.

79. A method according to claim 77, further comprising the step of managing locations at which the dot pattern data are developed.

80. An output method comprising:

providing first character storing means in an output apparatus main body, first character storing means for storing non-dot type character pattern information, the output apparatus having a plurality of attaching means for attaching second character storing means to the output apparatus main body the second character storing means being attachable to and detachable from at least one of the plurality of attaching means and for storing non-dot type character pattern information;

converting a character pattern in the first or second character storing means into a dot type character pattern and storing the converted character pattern in a cache; and controlling said converting step so that in a case where the second character storing means has been attached to a selected one of the plurality of attaching means, characters in the second character storing means are converted into dot type character patterns, and in a case where the second character storing means has not been attached to the selected one of the plurality of attaching means, characters in the first character storing means are converted into dot type character patterns, wherein the non-dot matrix type character pattern information stored in said first or second character storing means is of run-length type.

81. An output apparatus to which a detachable character storing means can be attached, comprising:

first character storing means which is provided in an output apparatus main body and which stores vector type character pattern information;

attaching means for attaching to the output apparatus main body a second character storing means which is attachable to and detachable from the output apparatus main body and which stores at least one of dot or vector type character pattern information;

means for recognizing whether the second character storing means has been attached or not;

means for converting vector type character pattern information in the second character storing means into a dot type character pattern rather than converting vector type character pattern information in said first character storing means when it is recognized by said recognizing means that the second character storing means has been attached; and means for caching in a memory the dot type character pattern converted by said converting means.

82. An apparatus according to claim 81, wherein said converting means converts the non-dot type character patterns into dot type character patterns for caching.

83. An apparatus according to claim 81, wherein the conversion by said converting means comprises generation of dot type character patterns on the basis of character codes.

84. A character generating apparatus comprising:

first memory means for storing vector type character pattern information;

converting means for converting vector type character pattern information into a dot type character pattern; and cache memory means for storing the dot type character pattern converted by said converting means;

wherein said converting means converts vector type character pattern information into a dot type character pattern in response to said character generating apparatus being turned on.

85. An apparatus according to claim 84, wherein upon storage of the converted dot type character pattern, said cache memory means stores that character pattern in a FIFO method when said cache memory means has no storage area sufficient to store that character pattern.

86. An apparatus according to claim 84, wherein said first memory means comprises a cartridge attachable to and detachable from said apparatus.

87. An apparatus according to claim 84, further comprising means for outputting the dot type character pattern stored in the second memory means.

88. An apparatus according to claim 87, wherein said output means comprises a laser beam printer.

89. An apparatus according to claim 87, wherein said output means comprises an LED printer.

90. An apparatus according to claim 87, wherein said output means comprises an LCD printer.

91. An apparatus according to claim 87, wherein said output means comprises an ink jet printer.

92. An apparatus according to claim 84, wherein said converting means performs the conversion operation during a warm up of a printer engine.

93. An outputting method comprising:

storing vector type character pattern information in first character storing means provided in an output apparatus main body;

selectably attaching to the output apparatus main body a second character storing means which stores at least one of dot or vector type character pattern information;

recognizing whether the second character storing means has been attached;

converting vector type character pattern information in the second character storing means into a dot-type character pattern rather than converting vector type character pattern information in said first character storing means when it is recognized in said recognizing step that the second character storing means has been attached; and caching in a memory the dot type character pattern converted in said converting step.

94. An outputting method according to claim 93, wherein in said converting step, the non-dot type character pattern is converted into dot-type character patterns for caching.

95. An outputting method according to claim 93, wherein said converting step comprises generating dot-type character patterns on the basis of character codes.

96. Method for generating characters in an output apparatus comprising the steps of:

storing vector type character pattern information;

converting the vector type character pattern information into a dot-type character pattern; and caching the dot-type character pattern converted in said converting step;

wherein said converting step is performed in response to said output apparatus being turned on.

97. A method according to claim 96, wherein when caching converted dot-type character patterns, the converted dot-type character patterns are cached in a FIFO method when insufficient storage is available.

98. A method according to claim 96, wherein said storing step stores non-dot type character pattern information to a cartridge which is attachable to and detachable from a character generating apparatus.

99. A method according to claim 96, further comprising the step of outputting the dot-type character pattern stored in the print memory.

100. A method according to claim 98, wherein said output step is performed to a laser beam printer.

101. A method according to claim 98, wherein said output step is performed to an LED printer.

102. A method according to claim 98, wherein said output step is performed to an LCD printer.

103. A method according to claim 98, wherein said output step is performed to an ink jet printer.

104. A method according to claim 96, wherein said converting step performs the conversion operation during a warm up of a printer engine.

* * * * *

UNITED STATES PATENT AND TRADEMARK OFFICE
CERTIFICATE OF CORRECTION

PATENT NO. : 5,567,061
DATED : October 22, 1996
INVENTOR(S) : Satoshi Nagata

Page 1 of 2

It is certified that error appears in the above-identified patent and that said Letters Patent is hereby corrected as shown below:

```
        Title page, item [57],
        In the Abstract, line 12, change "keen" to
 --been--.

Column 8, line 50, delete "and".

Column 10, line 23, change "Case" to --case--; and
                  line 30, change "is" to --is a--.

Column 11, line 35, delete "and".

Column 14, line 11, change "is" to --is a--.

Column 15, line 7, change "body" to --body,--.

Column 17, line 1, change "claim 98," to --claim
 99,--;
                  line 3, change "claim 98," to --claim
 99,--; and
                  line 5, change "claim 98," to --claim
 99--.
```

UNITED STATES PATENT AND TRADEMARK OFFICE
CERTIFICATE OF CORRECTION

PATENT NO. : 5,567,061

DATED : October 22, 1996

INVENTOR(S) : Satoshi Nagata

It is certified that error appears in the above-identified patent and that said Letters Patent is hereby corrected as shown below:

```
        Column 18, line 1, change "claim 98," to --claim
99,--.
```

Signed and Sealed this

Third Day of June, 1997

Attest:

BRUCE LEHMAN

*Attesting Officer*   Commissioner of Patents and Trademarks